United States Patent
Valler et al.

(10) Patent No.: US 9,278,618 B2
(45) Date of Patent: Mar. 8, 2016

(54) POWERTRAIN INCLUDING AN ELECTRIC MOTOR/GENERATOR AND A FINAL DRIVE UNIT CONNECTED TO THE ELECTRIC MOTOR/GENERATOR

(71) Applicant: GM GLOBAL TECHNOLOGY OPERATIONS LLC, Detroit, MI (US)

(72) Inventors: Gary R. Valler, Greenfield, IN (US); Nathan G. Rues, Fishers, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 200 days.

(21) Appl. No.: 14/065,824

(22) Filed: Oct. 29, 2013

(65) Prior Publication Data

US 2015/0119180 A1    Apr. 30, 2015

(51) Int. Cl.
*F16H 48/06* (2006.01)
*B60K 17/16* (2006.01)
*B60K 1/00* (2006.01)

(52) U.S. Cl.
CPC . *B60K 17/16* (2013.01); *B60K 1/00* (2013.01); *F16H 48/06* (2013.01); *B60K 2001/001* (2013.01)

(58) Field of Classification Search
None
See application file for complete search history.

(56) References Cited

U.S. PATENT DOCUMENTS

| | | | | |
|---|---|---|---|---|
| 6,864,607 B2* | 3/2005 | Hashimoto | | 310/75 R |
| 7,247,117 B2* | 7/2007 | Forster | | 475/221 |
| 8,734,283 B2* | 5/2014 | Takuno et al. | | 475/177 |
| 2003/0094322 A1* | 5/2003 | Bowen | | 180/65.6 |
| 2011/0218070 A1* | 9/2011 | Mack et al. | | 475/150 |

FOREIGN PATENT DOCUMENTS

| AT | WO 2011003875 A1 * | 1/2011 | B60K 17/046 |
|---|---|---|---|
| KR | 20130084566 A | 7/2013 | |

* cited by examiner

*Primary Examiner* — Justin Holmes
(74) *Attorney, Agent, or Firm* — Quinn Law Group, PLLC

(57) ABSTRACT

A powertrain can provide propulsive power to a vehicle and includes an electric motor/generator including a motor housing, and a final drive unit partially disposed in the motor housing. The final drive unit includes a gear case coupled to the motor housing. The final drive unit further includes a differential disposed in the gear case. The differential includes a differential housing. The final drive unit further includes a first final drive bearing disposed around the differential housing. The first final drive bearing is supported by the bearing support structure connected to the motor housing. The final drive unit further includes a second final drive bearing disposed around the differential housing. The second final drive bearing is supported by the gear case.

14 Claims, 5 Drawing Sheets

POWERTRAIN INCLUDING AN ELECTRIC MOTOR/GENERATOR AND A FINAL DRIVE UNIT CONNECTED TO THE ELECTRIC MOTOR/GENERATOR

TECHNICAL FIELD

The present disclosure relates to a powertrain including an electric motor/generator and a final drive unit operatively connected to the electric motor/generator.

BACKGROUND

Vehicles include a powertrain capable of generating propulsive power. The powertrain may include an internal combustion engine, an electric motor/generator, or both. For example, hybrid vehicles include more than one source of power in the powertrain. Specifically, a hybrid vehicle may include an internal combustion engine and an electric motor/generator. An electric vehicle, on the other hand, may include one or more electric motor/generators.

Regardless of the kind of power source, vehicles include a final drive unit for transmitting torque to the vehicle wheels. For example, the final drive unit may transmit torque from an electric motor/generator to the vehicle wheels. The final drive unit includes a differential, which allows the vehicle wheels to rotate at different speeds.

SUMMARY

Electric motors/generators and final drive units are disposed inside a vehicle body and include moving parts that are subjected to stress. It is therefore useful to minimize stress in the electric motor/generator and the final drive unit. It is also useful to minimize the space occupied by the final drive unit and the electric motor/generator in the vehicle body. To do so, at least one bearing of the final drive unit may be supported by the motor housing of the electric motor/generator.

The present disclosure relates to powertrains. In an embodiment, the powertrain can provide propulsive power to a vehicle and includes an electric motor/generator including a motor housing, and a final drive unit partially disposed in the motor housing. The final drive unit includes a gear case coupled to the motor housing. The final drive unit further includes a differential disposed in the gear case. The differential includes a differential housing. The final drive unit also includes a first final drive bearing disposed around the differential housing. The first final drive bearing is supported by the motor housing. The final drive unit further includes a second final drive bearing disposed around the differential housing. The second final drive bearing is supported by the gear case.

The present disclosure also relates to vehicles such as cars and trucks. In an embodiment, the vehicle includes an energy storage device configured to supply electrical energy and an electric motor/generator electrically connected to the energy storage device. The electric motor/generator is configured to convert electrical energy received from the energy storage device and convert the electrical energy into mechanical energy. The electric motor/generator includes a motor housing. The vehicle further includes a final drive unit operatively coupled to the electric motor/generator. The final drive unit includes a gear case coupled to the motor housing. Further, the final drive unit includes a differential disposed in the gear case. The differential includes a differential housing. The final drive bearing is supported by the motor housing.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
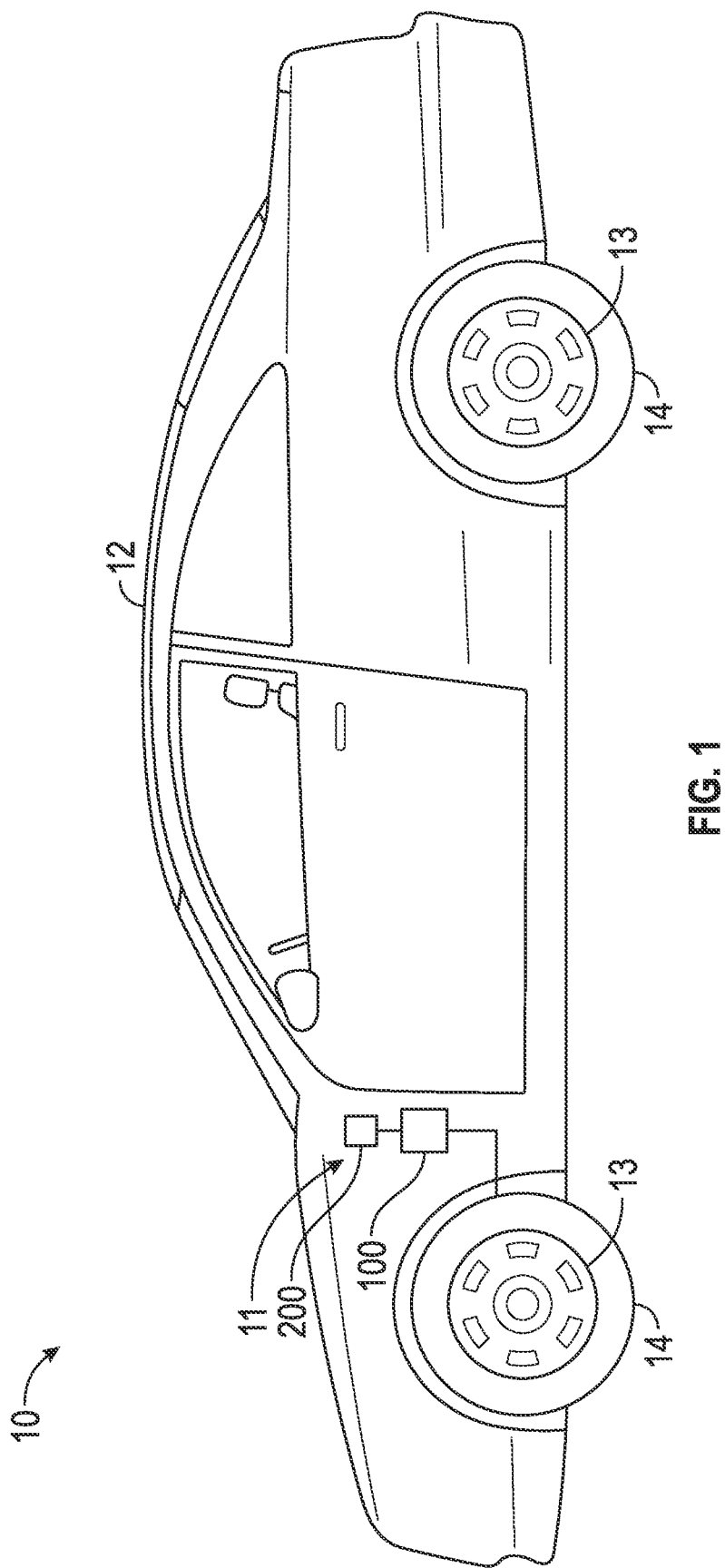
FIG. 1 is a schematic, side view of a vehicle including a powertrain having an electric motor/generator and an energy storage device electrically connected to the electric motor/generator.

Referring to the drawings, wherein like reference numbers refer to like components throughout the several figures, FIG. 1 schematically illustrates a vehicle 10, such as a car, including a vehicle body 12. The vehicle 10 further includes a plurality of wheels 13 operatively coupled to the vehicle body 12. Each wheel 13 is coupled to a tire 14.

In addition to the tires 14, the vehicle 10 includes a powertrain 11 for providing propulsive power to vehicle 10. The powertrain 11 includes an electric motor/generator 100 and an energy storage device 200 disposed within the vehicle body 12. The electric motor/generator 100 is also disposed within the vehicle body 12 and is operatively coupled to the wheels 13. The energy storage device 200 is electrically connected to the electric motor/generator 100. The energy storage device 200 may be one or more batteries and can supply electrical energy to the electric motor/generator 100. The electric motor/generator 100 can receive electrical energy from the energy storage device 200 and can convert the electrical energy into mechanical energy. Accordingly, the electric motor/generator 100 can provide torque to the wheels 13 in order to propel the vehicle 10. The electric/motor generator 100 is not necessarily part of the powertrain 11. In addition, the electric/motor generator 100 and the energy storage device 200 may be near the front wheels 13 or near the rear wheels 13.

Figure 2:
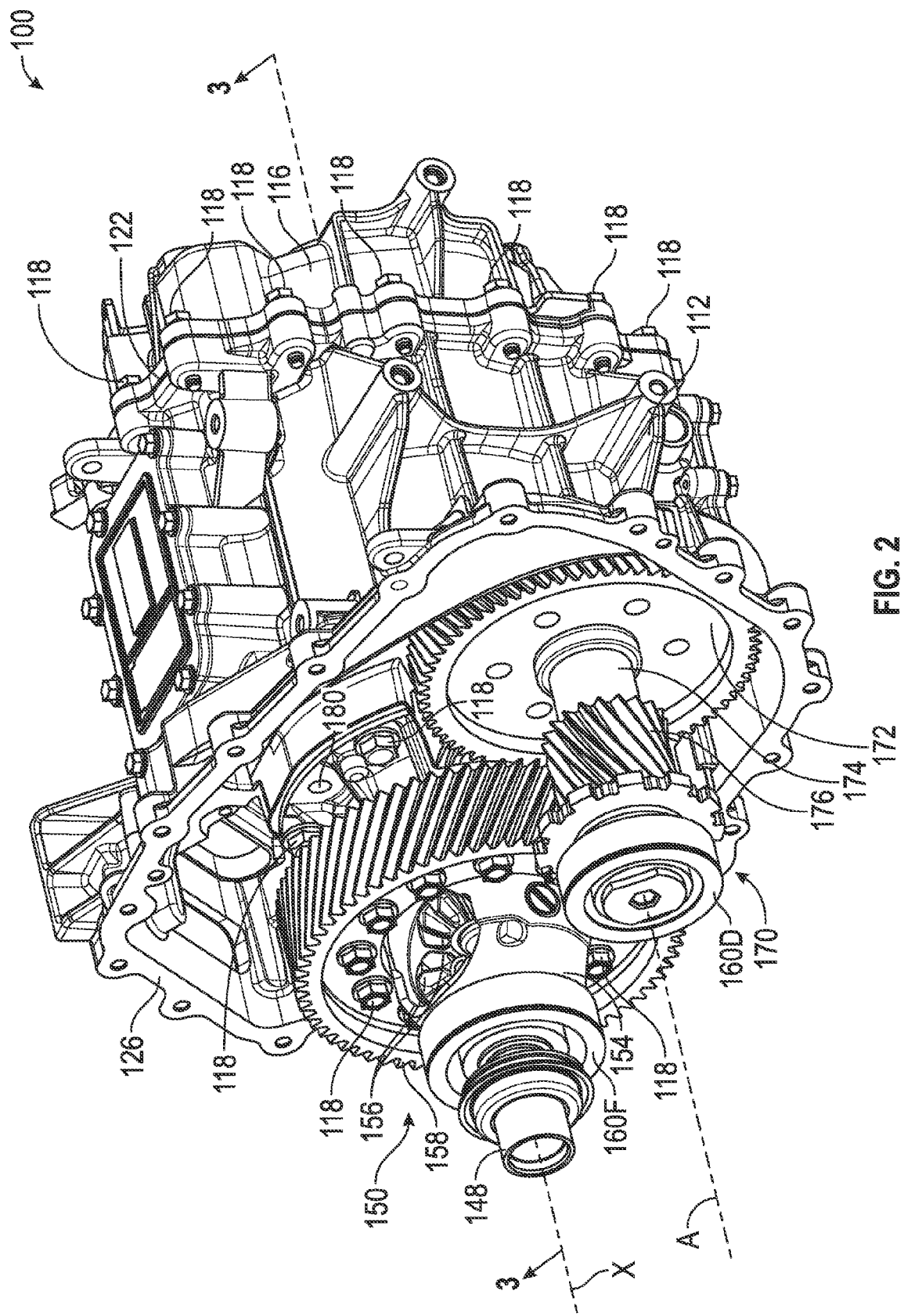
FIG. 2 is a schematic, perspective view of the electric motor/generator and final drive unit schematically shown in FIG. 1 with gear case not shown.
Figure 3:
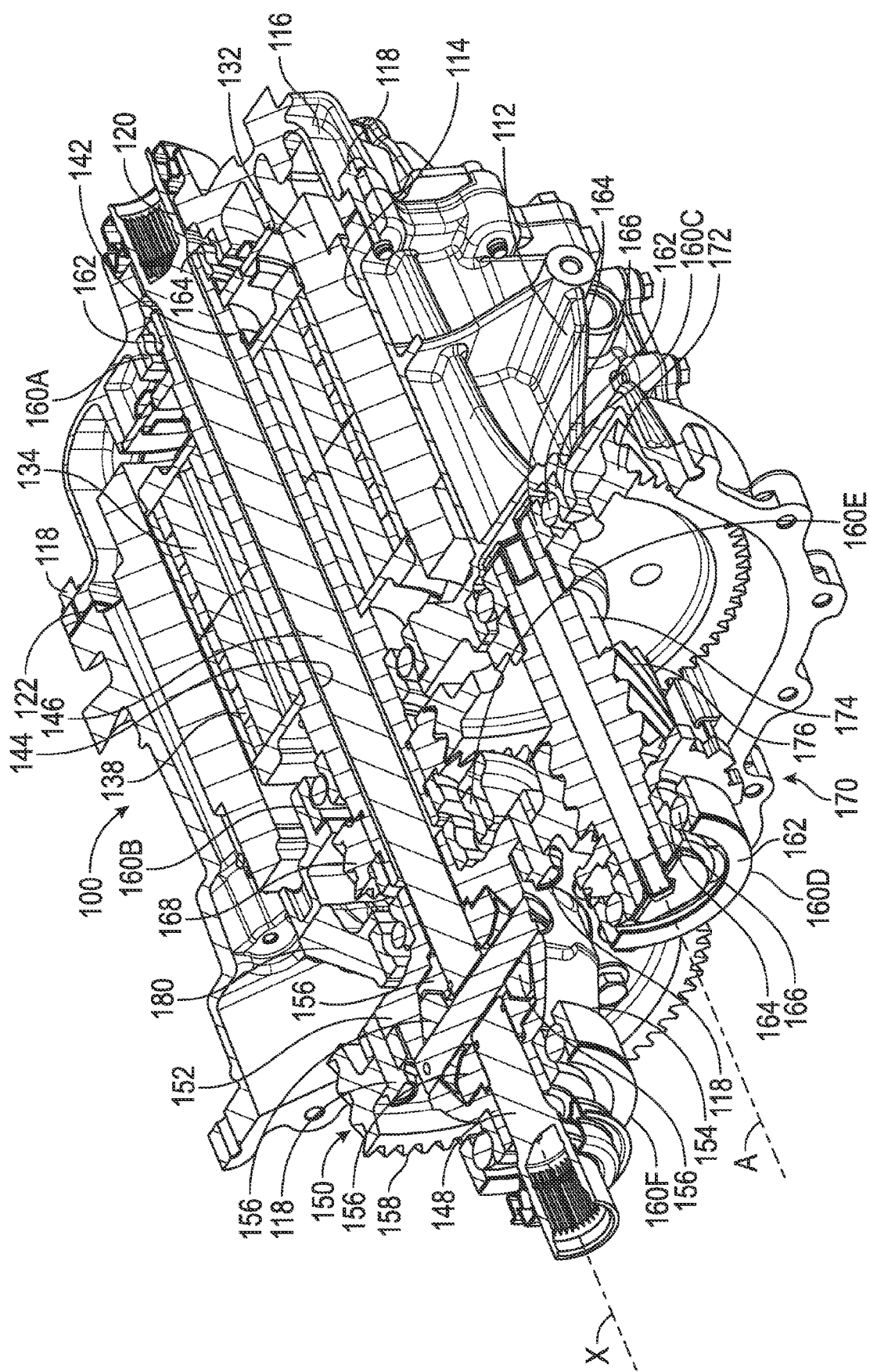
FIG. 3 is a schematic, sectional perspective view of the electric motor/generator and the final drive unit of FIG. 2, taken along a section line 3-3 of FIG. 2 with gear case not shown.
Figure 4:
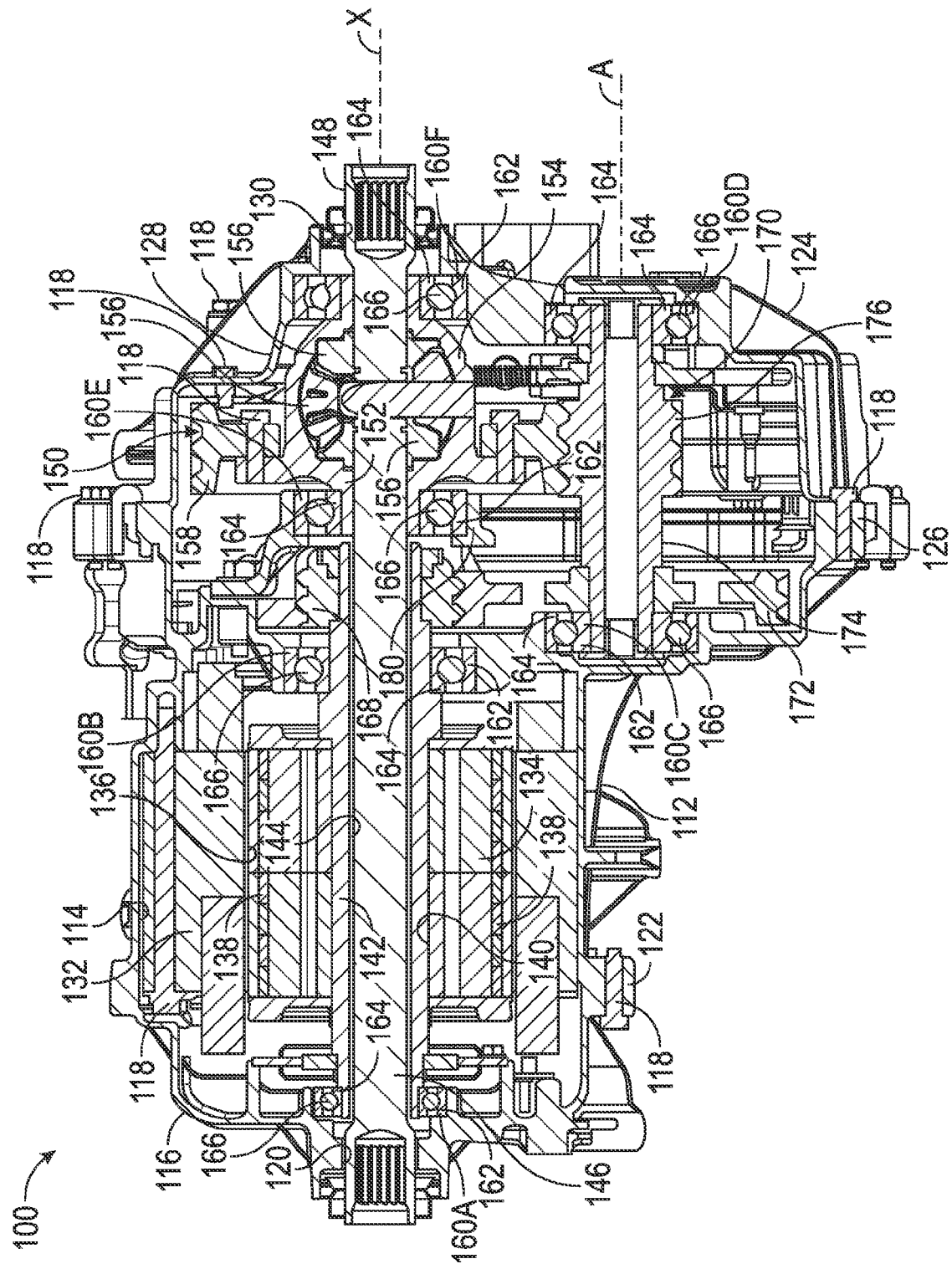
FIG. 4 is a schematic, sectional top view of the electric motor/generator and final drive unit of FIG. 2.

FIGS. 2-4 schematically illustrate the electric motor/generator 100, which is configured to convert electrical energy to mechanical energy and thereby provide torque to the wheels 13. The electric motor/generator 100 may also be referred to as an electric drive unit and can also convert mechanical energy into electrical energy. In the depicted embodiment, the electric motor/generator 100 includes a motor housing 112 defining an inner cavity 114. The inner cavity 114 is configured, shaped, and sized to receive other components of the electric motor/generator 100 as discussed in detail below.

In addition to the motor housing 112, the electric motor/generator 100 includes an end cap 116 for at least partially sealing the inner housing cavity 114. The end cap 116 may be directly coupled to a first edge 122 of the motor housing 112. Fasteners 118, such as bolts, can be used to directly couple the end cap 116 to the motor housing 112. The end cap 116 defines a cap hole 120 that leads to the inner cavity 114.

Accordingly, the cap hole 120 is in communication with the inner cavity 114 when the end cap 116 is coupled to the motor housing 112. The end cap 116 may be directly coupled to a first edge 122 of the motor housing 112.

With specific reference to FIG. 4, the powertrain 11 further includes a gear case 124 directly coupled to a second edge 126 of the motor housing 112. Fasteners 118, such as bolts, can be used to directly couple the gear case 124 to the motor housing 112. The gear case 124 is made of a substantially rigid material, such as metal, and defines an inner case cavity 128 and a case hole 130 leading to the inner case cavity 128. The case hole 130 is therefore in communication with the inner case cavity 128.

With continued reference to FIG. 4, the electric motor/generator 100 additionally includes a stator 132 electrically connected to the energy storage device 200 (FIG. 1) and a rotor 134 disposed within the motor housing 112. In particular, the stator 132 is fixed to the motor housing 112 and, consequently, the stator 132 remains stationary relative to the motor housing 112. The stator 132 may include electrical conductors (not shown) configured to receive electrical energy from the energy storage device 200. Moreover, the stator 132 has a substantially annular shape and defines an inner stator cavity 136 configured, shaped, and sized to receive the rotor 134. A substantially annular air gap is defined between the stator 132 and rotor 134.

The rotor 134 is disposed concentrically with the stator 132, may be wholly or partly made of a metallic material, such as steel, and includes a plurality of permanent magnets 138 annularly arranged around a longitudinal axis X. The permanent magnets 138 may be wholly or partly made of an alloy of a rare earth element such as neodymium, samarium, or any other suitable ferromagnetic material. Suitable ferromagnetic materials include a Neodymium Iron Boron (NdFeB) alloy and a Samarium Cobalt (SmCo) alloy. Regardless of its composition, the permanent magnets 138 are configured to magnetically interact with the electrical conductors (not shown) of the stator 132. During operation of the electric motor/generator 100, the rotor 134 rotates about the longitudinal axis X in response to the magnetic flux developed between the electrical conductors (not shown) of the stator 132 and the permanent magnets 138, thereby generating drive torque to power the vehicle 10. The rotor 134 may have a substantially annular shape and may therefore define an inner rotor cavity 140. It is contemplated that the rotor 134 does not necessarily include permanent magnets. For example, induction motors include rotors that do not have magnets.

Further, the electric motor/generator 100 includes a rotor shaft 142 disposed in the inner rotor cavity 140. Accordingly, the inner rotor cavity 140 is configured, shaped, and sized to receive the rotor shaft 142. The rotor shaft 142 is operatively coupled to the rotor 134 and, consequently, can rotate synchronously with the rotor 134 about the longitudinal axis X. Consequently, torque can be transferred from the rotor 134 to the rotor shaft 142. In the depicted embodiment, the rotor shaft 142 is concentrically positioned relative to the rotor 134. Hence, the rotor shaft 142 extends along the longitudinal axis X. Further, the rotor shaft 142 is substantially hollow and thus defines an inner shaft cavity 144.

At least one rotor bearing 160A may support the rotor shaft 142. In the depicted embodiment, the electric motor/generator 100 includes first rotor bearings 160A and a second rotor bearing 160B. The rotor bearings 160A, 160B may be ball bearings and each includes an annularly shaped outer race 162, an annularly shaped inner race 164, and a plurality of balls 166 disposed between the outer and inner races 162, 164. The outer race 162 is fixed to the end cap 116 and therefore remains stationary relative to the rotor shaft 142 and the end cap 116. The inner race 164, on the other hand, is rotationally coupled to the rotor shaft 142 and can thus rotate synchronously with the rotor shaft 142 about the longitudinal axis X. The balls 166 are annularly arranged around the longitudinal axis X between the outer and inner races 162, 164.

The electric motor/generator 100 additionally includes a first output shaft 146 extending along the longitudinal axis X. The first output shaft 146 is operatively coupled to at least one wheel 13 (FIG. 1) and is partly disposed in the inner shaft cavity 144 of the rotor shaft 142. Thus, the inner shaft cavity 144 of the rotor shaft 142 is configured, shaped, and sized to receive the first output shaft 146.

Aside from the first output shaft 146, the electric motor/generator 100 includes a rotor gear 168 operatively coupled to the rotor shaft 142. In particular, the rotor gear 168 is disposed around the rotor shaft 142 and is rotationally coupled to the rotor shaft 142. As such, the rotor gear 168 can rotate synchronously with the rotor shaft 142 about the longitudinal axis X. It is contemplated that the rotor gear 168 may be a spur gear. During operation of the electric motor/generator 100, torque can be transferred from the rotor shaft 142 to the rotor gear 168.

The powertrain 11 (FIG. 1) further includes a countershaft assembly 170 operatively coupled to the rotor gear 168. The countershaft assembly 170 is disposed with the motor housing 112 and the gear case 124. In the depicted embodiment, the countershaft assembly 170 includes a first countershaft gear 172 and a countershaft 174 operatively coupled to the first countershaft gear 172. The first countershaft gear 172 may be a spur gear and is meshed with the rotor gear 168, thereby allowing torque to be transferred from the rotor gear 168 to the first countershaft gear 172. The first countershaft gear 172 can rotate about a rotational axis A and is disposed around a portion of the countershaft 174.

The countershaft 174 extends along the rotational axis A and is rotationally coupled to the first countershaft gear 172. Accordingly, the countershaft 174 can rotate synchronously with the first countershaft gear 172. During operation of the electric motor/generator 100, torque can be transferred from the first countershaft gear 172 to the countershaft 174.

The countershaft assembly 170 also includes a first or inboard countershaft bearing 160C and a second or outboard countershaft bearing 160D. The first and second countershaft bearings 160C, 160D support the countershaft 174 and may be ball bearings as discussed above with respect to the rotor bearing 160A. In particular, the first and second countershaft bearings 160C, 160D may be disposed around the countershaft 174. The outer race 162 of the first countershaft bearing 160C is fixed to the motor housing 112, whereas the outer race 162 of the second countershaft bearing 160D is fixed to the gear case 124.

In addition to the first and second countershaft bearings 160C, 160D, the countershaft assembly 170 includes a second countershaft gear 176 configured to rotate along with the countershaft 174. In the depicted embodiment, the second countershaft gear 176 is monolithically formed with the countershaft 174 and has a smaller diameter than the first countershaft gear 172. Accordingly, during operation of the electric motor/generator 100, the second countershaft gear 176 can rotate about the rotational axis A synchronously with the countershaft 174.

The powertrain 11 further includes a final drive unit 150 operatively coupled between the first output shaft 146 and the countershaft assembly 170. In particular, the final drive unit 150 includes a final drive gear 158 meshed with the second countershaft gear 176. The final drive gear 158 may be a spur gear. During operation of the electric motor/generator 100, torque can be transferred from the second countershaft gear 176 to the final drive gear 158.

The final drive unit 150 further includes a differential 152 operatively coupled to the final drive gear 158. The differential 152 allows the wheels 13 (FIG. 1) to rotate at different speeds and includes a differential housing 154 operatively coupled to the final drive gear 158. Fasteners 118, such as bolts, can be used to directly couple the differential housing 154 to the final drive gear 158. Thus, torque can be transferred from the final drive gear 158 to the differential housing 154. The differential housing 154 can therefore rotate along with the final drive gear 158.

In addition, the final drive unit 150 includes a plurality of bevel gears 156 disposed within the differential housing 154. The bevel gears 156 are operatively coupled to the first output shaft 146 and a second output shaft 148. The final drive unit 150 is operatively coupled between the first output shaft 146 and a second output shaft 148.

The second output shaft 148 is operatively coupled to at least one wheel 13 (FIG. 1) and is part of the final drive unit 150. The second output shaft 148 is concentrically disposed relative to the first output shaft 146. Accordingly, the first and second output shafts 146, 148 extend along the longitudinal axis X and are substantially parallel to each other. The first output shaft 146 may be longer than the second output shaft 148.

The final drive unit 150 further includes a first or inboard final drive bearing 160E and a second or outboard final drive bearing 160F. The first and second final drive bearings 160E, 160F may be ball bearings as described above with respect to the rotor bearing 160A. The inner race 164 of the first final drive bearing 160E is rotationally coupled to the differential housing 154, while the outer race 162 of the first final drive bearing 160E is fixed to the motor hosing 112 via a bearing support structure 180 as discussed in detail below. The outer race 162 of the second final drive bearing 160F is fixed to the gear case 124, and the inner race 164 of the second final drive bearing 160F is rotationally coupled to the differential housing 154.

Figure 5:
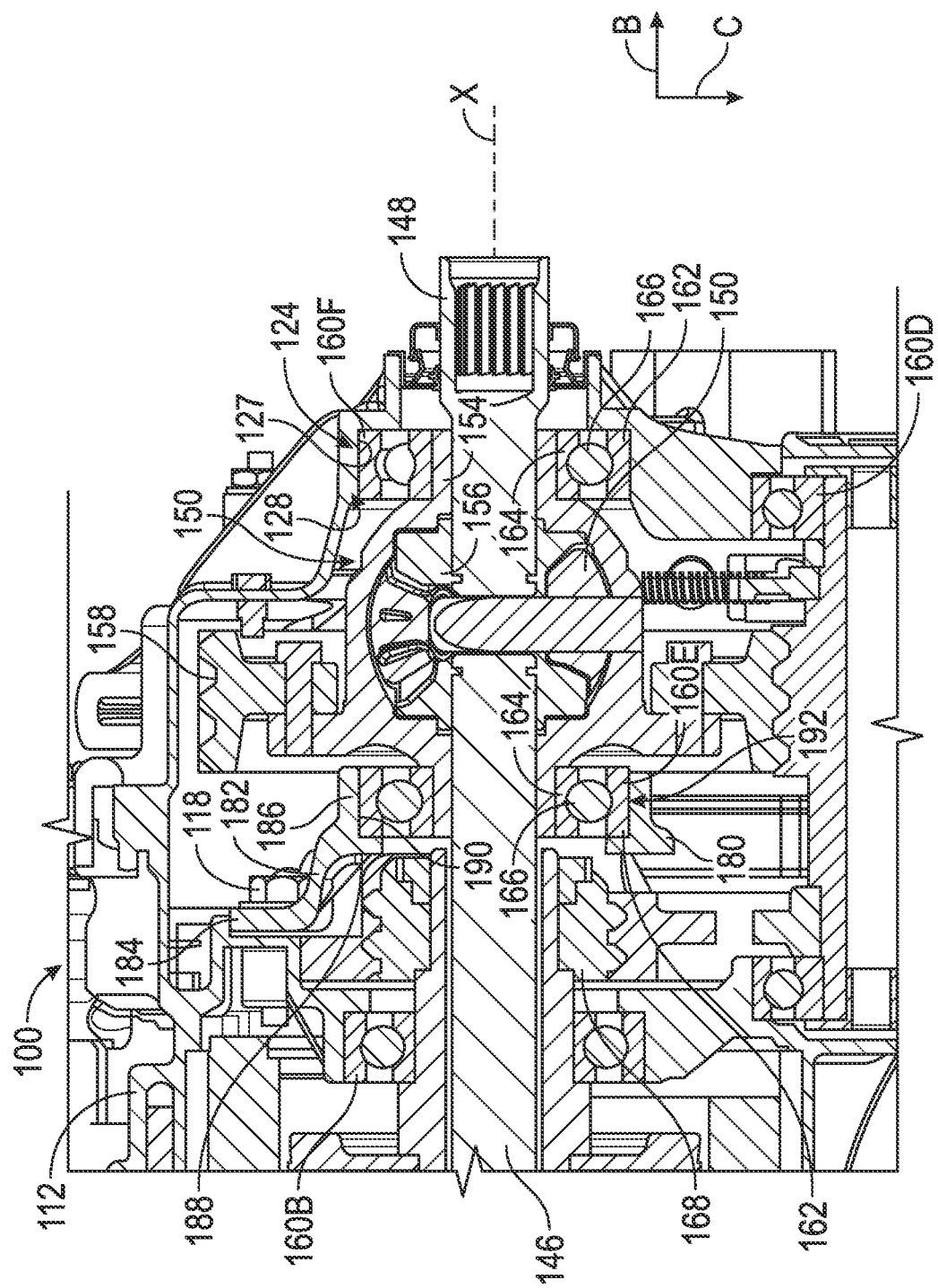
FIG. 5 is an enlarged schematic, sectional top view of the electric motor/generator and the final drive unit of FIG. 2.

With reference to FIG. 5, it is useful to minimize to the space occupied by the final drive unit 150 in the vehicle 10 and to reduce the stresses in the bearing support structure 180. To do so, the first final drive bearing 160E can be supported by the motor housing 112, and the second final drive bearing 160F can be supported by the gear case 124. Specifically, the bearing support structure 180 couples the first final drive bearing 160E to the motor housing 112. Fasteners 118, such as bolts, can be used to directly couple the motor housing 112 to the bearing support structure 180. The bearing support structure 180 is directly coupled to the motor housing 112 using fasteners 118. Regardless, the bearing support structure 180 is operatively coupled between the motor housing 118 and the first final drive bearing 160E.

With continued reference to FIG. 5, the bearing support structure 180 is substantially hollow and may be made of a substantially rigid material such as metal. In the depicted embodiment, the bearing support structure 180 includes a support body 182 and a rim 184 disposed around the support body 182. The rim 184 may define a plurality of holes (not shown) each configured, shaped, and sized to receive at least one fastener 118. The fasteners 118 can therefore be disposed through the rim 184 and into the motor housing 112 in order to couple the bearing support structure 180 to the motor housing 112. The bearing support structure 180 is not directly coupled to the gear case 124.

The bearing support structure 180 further includes first and second walls 186, 188 extending from the support body 182. The first wall 186 has a substantially annular shape and extends from the support body extending in a first direction indicated by arrow B (i.e., in a direction substantially parallel to the longitudinal axis X). The second wall 188 also has a substantially annular shape and extends from the support body 182 in a second direction indicated by arrow C (i.e., in a direction substantially perpendicular to the longitudinal axis X). The first direction B and the second direction C are substantially perpendicular. The first and second walls 186, 188 are therefore substantially perpendicular to each other.

The first and second walls 186, 188 collectively define an inner support surface 190 that directly contacts the outer race 162 of the first final drive bearing 160E. Thus, the inner support surface 190 is in direct contact with the first final drive bearing 160E. In particular, the outer race 162 of the first final drive bearing 160E may be directly fixed to the first and second walls 186, 188. Consequently, the outer race 162 of the first final drive bearing 160E remains stationary relative to the bearing support structure 180 and the motor housing 112. As discussed above, the inner race 164 of the first final drive bearing 160E is rotationally coupled to the differential housing 154 and can therefore rotate along with the differential housing 154. The inner support surface 190 defines an inner support cavity 192 configured, shaped, and sized to receive at least a portion of the first final drive bearing 160E. By attaching the first final drive bearing 160E to the motor housing 112, the stress and size of the bearing support structure 180 are minimized and the space occupied by the final drive unit 150 in the vehicle 10 are minimized. It is useful to minimize the stress in the bearing support structure 180 to expand its life.

The second final drive bearing 160F is fixed to an inner case surface 127 of the gear case 124. The inner case surface 127 defines the inner case cavity 128. Hence, the second final drive bearing 160F is disposed in the inner case cavity 128. Specifically, the outer race 162 of the second final drive bearing 160F is fixed to the inner case surface 127 and therefore remains stationary relative to the gear case 124. The inner race 164 of the second final drive bearing 160F is rotationally coupled to the differential housing 154 and can therefore rotate along with the differential housing 154.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A powertrain, comprising:
an electric motor/generator including a motor housing;
a final drive unit partially disposed in the motor housing, wherein the final drive unit includes:
   a gear case coupled to the motor housing;
   a differential disposed in the gear case, wherein the differential includes a differential housing;
   a first final drive bearing disposed around the differential housing, wherein the first final drive bearing is supported by the motor housing;
   a second final drive bearing disposed around the differential housing, wherein the second final drive bearing is supported by the gear case;
   a bearing support structure coupled between the motor housing and the first final drive bearing, wherein the bearing support structure is directly coupled only to the motor housing and the first final drive bearing, and the bearing support structure is not directly coupled to the gear case; and at least one fastener coupling the bearing support structure to the motor housing, wherein the bearing support structure only supports the first final drive bearing and the at least one fastener.

2. The powertrain of claim 1, wherein the bearing support structure includes a support body and a rim disposed around the support body.

3. The powertrain of claim 2, wherein the bearing support structure is directly fixed to the motor housing via the rim.

4. The powertrain of claim 3, wherein the bearing support structure further includes first and second walls extending from the support body.

5. The powertrain of claim 4, wherein the first wall extends from the support body in a first direction, and the second wall extends from the support body in a second direction, and the second direction is perpendicular to the first direction.

6. The powertrain of claim 5, wherein the first and second walls collectively define an inner support surface that is in direct contact with the first final drive bearing.

7. The powertrain of claim 6, wherein the inner support surface defines an inner support cavity configured to receive the first final drive bearing.

8. The powertrain of claim 1, wherein the bearing support structure is in direct contact with the first final drive bearing and the motor housing.

9. A vehicle, comprising:
an energy storage device configured to supply electrical energy;
an electric motor/generator electrically connected to the energy storage device, wherein the electric motor/generator is configured to convert electrical energy received from the energy storage device into mechanical energy, wherein the electric motor/generator includes a motor housing;
a final drive unit operatively coupled to the electric motor/generator, wherein the final drive unit includes:

a gear case coupled to the motor housing;
a differential disposed in the gear case, wherein the differential includes a differential housing;
a final drive bearing disposed around the differential housing, wherein the final drive bearing is supported by the motor housing; and
a bearing support structure coupled between the motor housing and the final drive bearing, wherein the bearing support structure is directly coupled only to the motor housing and the final drive bearing, and the bearing support structure is not directly coupled to the gear case; and
at least one fastener coupling the bearing support structure to the motor housing, wherein the bearing support structure only supports the final drive bearing and the at least one fastener.

10. The vehicle of claim 9, wherein the final drive bearing is a first final drive bearing, and the final drive unit further includes a second final drive bearing disposed around the differential housing, and the second final drive bearing is supported by the gear case.

11. The vehicle of claim 10, wherein the bearing support structure is coupled between the motor housing and the first final drive bearing.

12. The vehicle of claim 10, wherein the bearing support structure is in direct contact with the first final drive bearing and the motor housing.

13. The vehicle of claim 12, wherein the bearing support structure includes a support body and a rim disposed around the support body, and the bearing support structure is directly fixed to the motor housing.

14. The vehicle of claim 13, wherein the bearing support structure further includes first and second walls extending from the support body, the first and second walls collectively define an inner support surface that is in direct contact with the first final drive bearing, and the inner support surface defines an inner support cavity configured to receive the first final drive bearing.

* * * * *